United States Patent
Cucheran et al.

[11] Patent Number: 5,947,355
[45] Date of Patent: *Sep. 7, 1999

[54] VEHICLE ARTICLE CARRIER

[75] Inventors: John S. Cucheran, Lake Orion; Victor M. Bogdan, Northville, both of Mich.

[73] Assignee: JAC Products, Inc., Ann Arbor, Mich.

[*] Notice: This patent is subject to a terminal disclaimer.

[21] Appl. No.: 09/030,073

[22] Filed: Feb. 25, 1998

Related U.S. Application Data

[63] Continuation of application No. 08/641,681, May 2, 1996, Pat. No. 5,762,247.

[51] Int. Cl.⁶ .......................................... B60R 9/04
[52] U.S. Cl. ............................ 224/321; 224/326; 224/327
[58] Field of Search .................................... 224/327, 321, 224/325, 326, 309, 329, 331, 324

[56] References Cited

U.S. PATENT DOCUMENTS

| | | |
|---|---|---|
| 4,448,337 | 5/1984 | Cronce . |
| 4,469,261 | 9/1984 | Stapleton et al. . |
| 4,640,450 | 2/1987 | Gallion et al. . |
| 4,684,048 | 8/1987 | Bott . |
| 4,911,348 | 3/1990 | Rasor et al. . |
| 4,972,983 | 11/1990 | Bott . |
| 4,982,886 | 1/1991 | Cucheran . |
| 5,082,158 | 1/1992 | Bott . |
| 5,090,605 | 2/1992 | Cucheran . |
| 5,143,267 | 9/1992 | Cucheran et al. . |
| 5,170,920 | 12/1992 | Corrente et al. . |
| 5,190,198 | 3/1993 | Cucheran . |
| 5,203,483 | 4/1993 | Cucheran . |
| 5,205,453 | 4/1993 | Pudney et al. . |
| 5,207,366 | 5/1993 | Cucheran . |
| 5,385,285 | 1/1995 | Cucheran et al. . |
| 5,549,229 | 8/1996 | Grabowski . |

FOREIGN PATENT DOCUMENTS

| | | |
|---|---|---|
| 0 325 876 | 8/1989 | European Pat. Off. . |
| 0 694 441 A1 | 1/1996 | European Pat. Off. . |
| 2 196 309 | 4/1988 | United Kingdom . |
| 2 218 062 | 11/1989 | United Kingdom . |

*Primary Examiner*—Linda J. Sholl
*Attorney, Agent, or Firm*—Harness, Dickey & Pierce, PLC

[57] ABSTRACT

A vehicle article carrier 10 forming a low, aerodynamic profile when secured to an outer body surface of the vehicle. The vehicle article carrier includes a pair of slats each having channel portions which are adapted to reside at least partially within channels formed in the outer body surface of the vehicle during manufacture of the vehicle. The low profile of the slats serves to reduce the degree to which a pair of bracket members and at least one cross bar secured to the bracket members projects above the outer body surface, thereby enhancing the aesthetic appeal and improving the aerodynamic efficiency of the vehicle article carrier. In preferred embodiments each slat includes a plurality of tie-down loops integrally formed therewith. The bracket members each incorporate a manually movable locking member adapted to lockably engage with the slat to hold the bracket member at a desired position along the slat. When the locking member is in its unlocked position, the bracket members may be moved slidably along the slats and repositioned as desired.

18 Claims, 2 Drawing Sheets a vehicle article carrier which may be quickly and easily
VEHICLE ARTICLE CARRIER This is a continuation of U.S. Pat. application Ser. No. 08/641,681, filed May 2, 1996, now U.S. Pat. No. 5,762,247.

This invention relates to vehicle article carriers for supporting articles on an outer body surface of a vehicle, and more particularly to a vehicle article carrier incorporating a pair of elongated slats having portions adapted to reside partially within a pair of corresponding channels formed in the outer body surface of the vehicle.

DISCUSSION

Vehicle article carriers are used in a wide variety of applications to support various articles and forms of cargo elevationally above an outer body surface of a vehicle such as a roof or deck lid of the vehicle. Typically, such vehicle article carriers include some form of cross bar, and more typically a pair of cross bars, which are positioned widthwise across the outer body surface of the vehicle, and which are of sufficient strength to support the articles and/or cargo thereon. A pair of bracket members associated with each cross bar are included for supporting their associated cross bar elevationally above the outer body surface of the vehicle. A pair of slats adapted to be secured to the outer body surface of the vehicle are also included for supporting the bracket members thereon. In most instances, the slats are secured directly to the outer body surface and provide some structure for enabling the bracket member associated with each cross bar to be secured thereto. This often requires that each slat include significant structure which projects well above the outer body surface of the vehicle. This can often add to the wind resistance provided by the vehicle article carrier, which can sometimes reduce the fuel efficiency of the vehicle. Also, since the majority of the slat structure is visible, this can somewhat detract from the aesthetic appeal of the overall vehicle article carrier.

With presently manufactured vehicles, it is well within the manufacturing capability of the vehicle manufacturers to manufacture the roof or other outer body surface of the vehicle with integrally formed channels therein. By "manufacture" it is meant that the roof or other body portion of the vehicle is stamped or otherwise formed with a pair of elongated channels which extend below the plane of the outer body surface. As such, the channels typically are not visible to an observer unless the observer is standing at an elevated position relative to the vehicle and looking down on the outer body surface in which the channels are formed.

With the above manufacturing capability in mind, it would be highly desirable to provide a vehicle article carrier which is designed and intended to be used in connection with elongated channels formed in the outer body surface of the vehicle during the manufacture of the vehicle. More specifically, it is a principal object of the present invention to provide a vehicle article carrier incorporating a pair of elongated slats which are adapted to be fixedly secured to the outer body surface of the vehicle, but which are partially disposed and concealed within the elongated channels formed in the outer body surface. In-this manner, the degree of structure of the slat which is visible to the observer, and which projects above the outer body surface of the vehicle, is significantly reduced. This would provide a slat capable of slidably supporting one or more bracket members thereon which projects above the outer body surface only a very small degree, and which is therefore more aesthetically and aerodynamically appealing than conventional slats which project well above the outer body surface of the vehicle.

It is also an object of the present invention to provide a vehicle article carrier which may be quickly and easily secured to an outer body surface of a vehicle.

It is yet another object of the present invention to provide a vehicle article carrier which includes a pair of slats which each have one or more portions integrally formed therewith which form tie-down areas. The tie-down areas enable external fastening elements such as stretchable cords to be secured to further aid in securing cargo and other articles on a pair of cross bars.

SUMMARY OF THE INVENTION

The above and other objects are provided by a vehicle article carrier in accordance with preferred embodiments of the present invention. The vehicle article carrier generally comprises a pair of elongated slats which are securable to an outer body surface of a vehicle, wherein the outer body surface has been manufactured to include a pair of recessed channels extending parallel to one another. Each slat includes a base portion adapted to be fixedly secured to the outer body surface adjacent to one of the channels, and a channel portion formed so as to be at least partially disposed and housed within one of the channels. This significantly reduces the portion of each slat which projects above the outer body surface and which is therefore visible to an observer.

The preferred embodiments further include at least one cross bar having a pair of bracket members disposed at opposite ends thereof. Each bracket member includes an actuating member and a locking member movable between locked and unlocked positions by manual movement of the actuating member. The locking member of each bracket member is adapted to engage a portion of the slat when in the locked position so as to secure the bracket member at a desired location along its associated slat.

Each slat of the present invention further includes a channel member which is secured to the base portion. Each channel member includes a depending edge portion to which the locking member of its associated bracket member may be engaged to prevent movement of the bracket member when the locking member is in the locked position. In a preferred embodiment the depending edge portion projects outwardly so as to overlay its associated channel. In the preferred embodiments the slat and channel member are secured together by a single fastener to the outer body surface such that the base portion of the slat is disposed in between the outer body surface and the channel member with external fastening elements extending through aligned apertures in the base portion, the channel member and the outer body surface.

In one preferred embodiment each slat further includes a plurality of spaced apart, integrally formed tie-down loops extending from an edge of the base portion. The tie-down loops extend at an angle away from the outer body surface and enable external fastening elements such as stretchable cords to be used to help secure articles to the cross bar.

In the preferred embodiments the channel portion of each slat forms somewhat of a U-shape when viewed in cross section. The channel portion has dimensions sufficiently small to permit a major portion thereof to reside within the channel in the outer body surface. This is a principal advantage of the present invention in that the slat, when attached to the outer body surface, protrudes outwardly from the outer body surface significantly less than previously developed slats, and therefore helps to provide an even lower profile for the overall vehicle article carrier. This, in turn, helps reduce wind resistance and further enhances the aesthetic appearance of the vehicle article carrier.

BRIEF DESCRIPTION OF DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
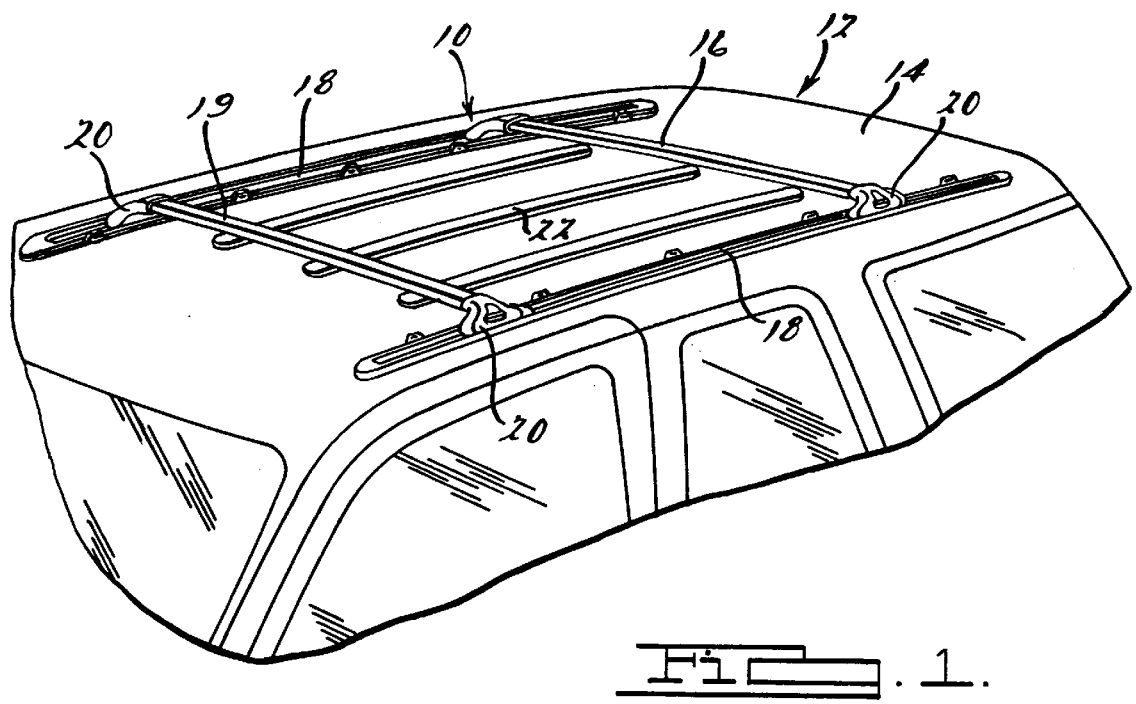
FIG. 1 is a perspective view of a vehicle article carrier in accordance with a preferred embodiment of the present invention showing the vehicle article carrier disposed on an outer body surface (i.e., a roof) of a vehicle.

Referring to FIG. 1, there is shown a vehicle 12 having a vehicle article carrier 10 in accordance with the preferred embodiments of the present invention mounted on an outer body surface 14 thereof. The vehicle article carrier 10 comprises a rear cross bar 16, a front cross bar 19, a pair of outer slats 18 and a plurality of bracket numbers 20. It will be appreciated that the outer slats 18 are a mirror image of each other in construction and are fixedly secured to the outer body surface 14 by a plurality of any form of conventional fasteners suitable for securing such components to the outer body surface 14. The bracket members 20 associated with each cross bar 16 and 19 are also mirror images to each other in construction such that one is suitable to be used on the driver's side of the vehicle 12 while the other is suitable to be used on the passenger side of the vehicle 12. It will also be appreciated that while both the front and rear cross bars 19 and 16, respectively, are shown as including bracket members 20, alternatively one or the other of the cross bars 19 and 16 could be fixedly secured to the slats 18 such that it is not movable along the slats 18. Finally, a plurality of optional, conventional intermediate slats 22 are shown secured to the outer body surface 14. These intermediate slats 22 further help to protect the outer body surface 14 from contact with articles secured on the vehicle article carrier 10. It will be appreciated, however, that the intermediate slats 22 are completely optional but, it is anticipated, will be desirable in many applications.

Figure 2:
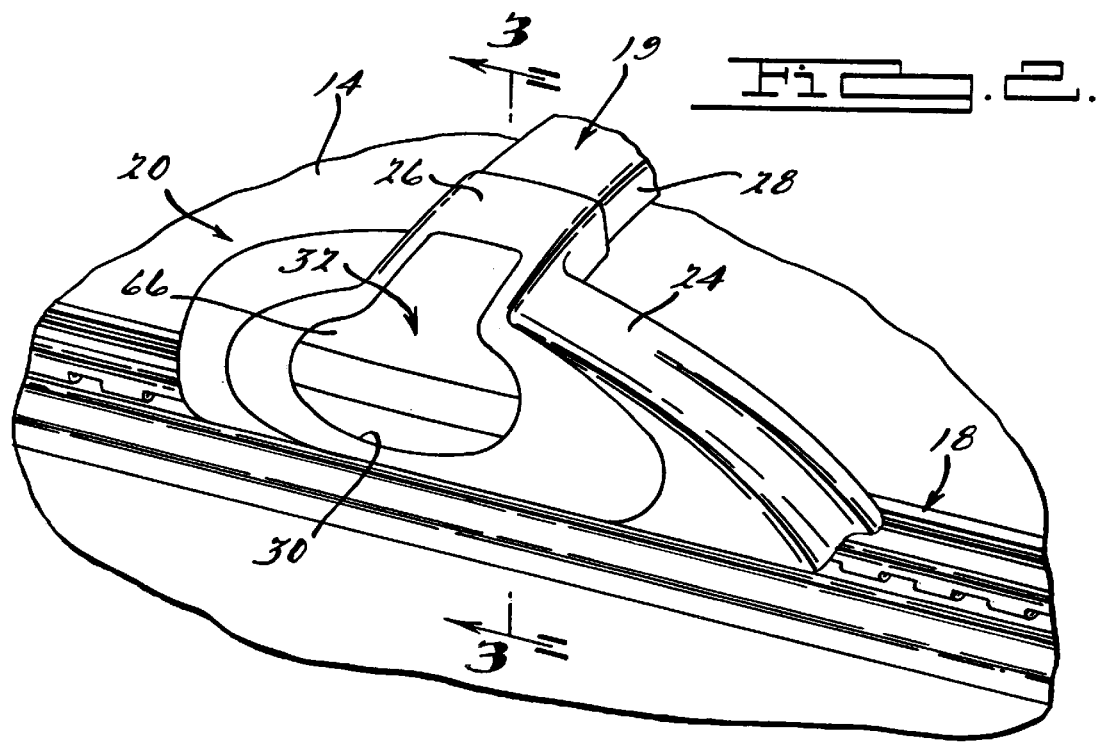
FIG. 2 is an enlarged perspective view of one of the bracket members, a portion of the cross bar attached thereto, and a portion of the slat upon which the bracket member is secured.

Referring to FIG. 2, one of the bracket members 20 and a portion of the front cross bar 19 is shown. Each bracket member 20 includes a housing 24 having a neck portion 26 adapted to receive a terminal end portion 28 of the cross bar 19 to support the cross bar 18 elevationally above the outer body surface 14 of the vehicle 12. The housing 24 includes a recessed area 30 (also visible in FIG. 3) in which an actuating member 32 is disposed. The entire bracket member 20 forms an aesthetically pleasing, highly aerodynamic structure when secured to its associated slat 18.

Figure 3:
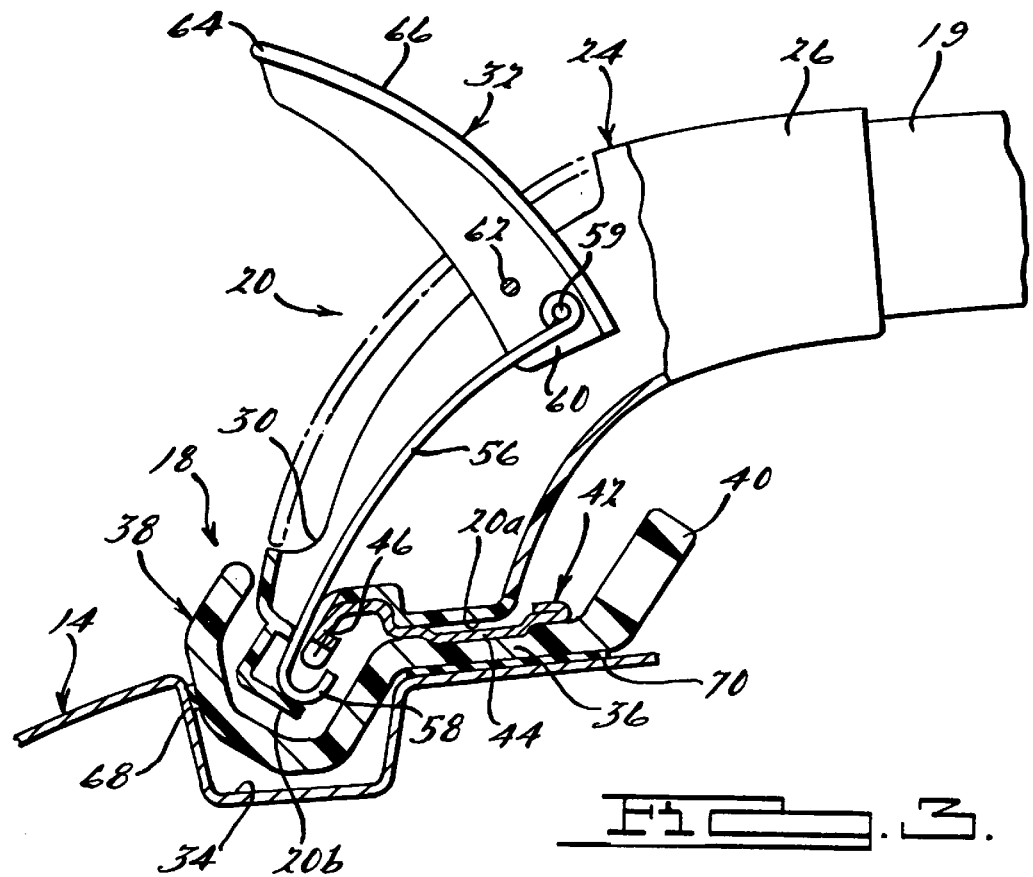
FIG. 3 is a cross-sectional side view of the bracket member secured to its associated slat in accordance with section line 3—3 in FIG. 2.

Referring to FIG. 3, the outer body surface 14 of the vehicle 12 can be seen to include a channel 34 formed therein. The channel 34 is formed during manufacture of the vehicle 12 to previously determined dimensions and overall shape. It will also be appreciated that a second channel 34 (not shown in FIG. 2 but shown in FIG. 4) is formed under the other one of the slats 18 and extends generally parallel to the channel 34 lengthwise along the vehicle 12 from front to rear of the vehicle. With brief reference to FIG. 1, it will be understood then that two channels, such as channel 34 in FIG. 2, extend underneath-each of the slats 18 along preferably a substantial length of the outer body surface 14. The channels 34 are also formed parallel to one another at a distance from one another which is predetermined before the outer body surface 14 of the vehicle is manufactured. The predetermined distance between the channels 34 is a distance in accordance with the length of each cross bar 19 and 16 which allows the cross bars 19 and 16 to be secured to the outer slats 18 when the outer slats 18 are secured to the outer body surface 14 adjacent their respective channels 34.

With continuing reference to FIG. 3, it can be seen that each slat 18 includes a base portion 36, an integrally formed, generally U-shaped channel portion 38 depending from one side of the base portion 36, and at least one integrally formed tie-down loop 40 depending from an opposite side of the base portion 36 in a manner such that it extends divergently away from the outer body surface 14. The channel portion 38 is further offset from the base portion 36 such that a substantial portion of the channel portion 38 extends into, and is concealed within, its associated channel 34 when the slat 18 is secured to the outer body surface 14. In the preferred embodiments, each slat 18 preferably includes a plurality of integrally formed tie-down loops 40 spaced apart along the length thereof. It will also be appreciated that the angle at which the tie-down loops 40 diverge away from the outer body surface is not critical, so long as the opening of each tie-down loop 40 is easily coupled to one or both ends of a stretchable external fastening member and does not interfere with sliding movement of its associated bracket member 20.

Figure 4:
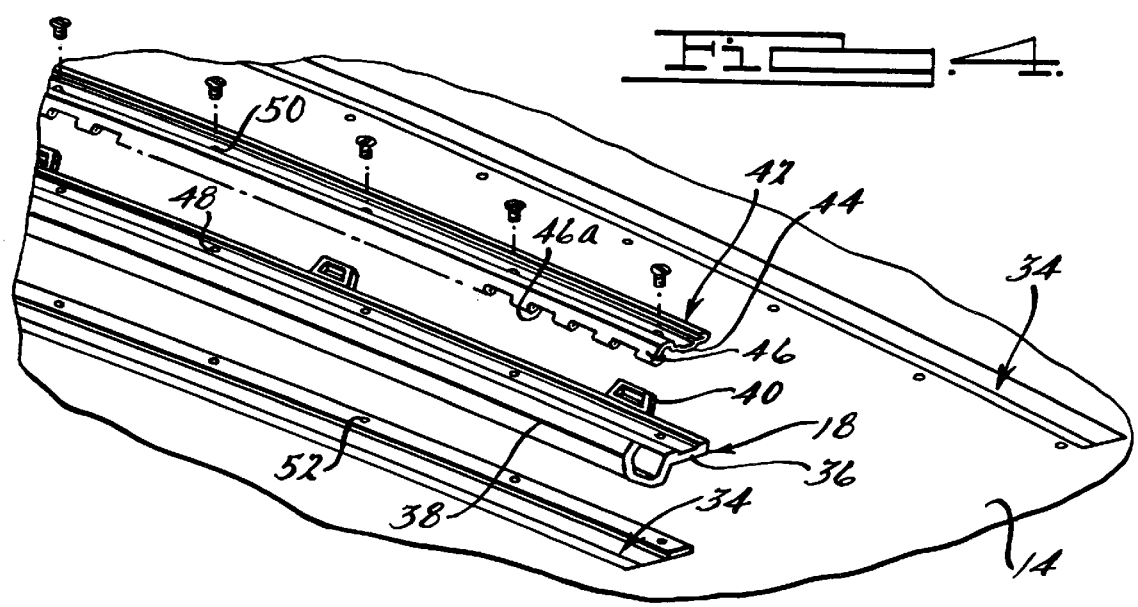
FIG. 4 is an exploded perspective view of a portion of one slat and its channel member in position to be secured to the outer body surface.

Referring further to FIGS. 3 and 4, the slat 18 includes an independently formed, elongated channel member 42. The channel member includes a bracket supporting portion 44 and an integrally formed, depending edge portion 46. The edge portion 46 is shaped so as to overlay the channel portion 38 formed in the outer body surface 14. The specific shape of the edge portion 46 could be varied considerably, provided it still includes a portion which projects toward the channel 34. In the preferred embodiments the edge portion 46 includes a plurality of spaced apart notches 46a, the function of which will be described momentarily. The channel member 42 extends preferably along substantially the entire length of the slat 18 and is preferably roll formed from a suitably strong material such as metal. Alternatively, the channel member could be extruded or stamped.

With brief reference to FIG. 4, the slat 18 includes a plurality of spaced apart apertures 48 formed in the base portion 36. The channel member 42 also has a plurality of apertures 50 formed in its bracket supporting portion 44. Finally, the outer body surface 14 includes a plurality of apertures 52 formed therein. The apertures 48, 50 and 52 are formed so as to be vertically aligned to allow conventional external fastening elements 54 to be used to extend through the apertures and secure the channel member 42 and the slat 18 to the outer body surface 14. When secured in this manner, the base portion 36 of the slat 18 is interposed or "sandwiched" between the outer body surface 14 and the bracket supporting portion 44 of the channel member 42.

With continued reference to FIG. 3, the bracket member 20 also includes a locking member 56 which comprises a relatively thin, elongated length of spring steel. A lower end of the locking member 56 is formed into a hook portion 58 while an upper end of the locking member 56 is secured pivotally at point 59 to an inner end portion 60 of the actuating member 32. The actuating member 32 is also itself pivotally secured to internal structure of the bracket member 20 at pivot point 62 such that when an outer end portion 64 of the actuating member is lifted outwardly as shown in FIG. 3, the rotation of the actuating member 32 causes the hook portion 58 to be moved away from the edge portion 46 of the channel member 42. Preferably one or more fixedly mounted hooks 20b are secured to a bottom portion 20a of the bracket member 20. Each hook 20b may comprise a molded hook or a separately stamped component part which is insert molded into the bottom portion 20a of the bracket member 20 or screwed to the bottom portion 20a. In the unlocked position, the bottom portion 20a of the bracket member 20 may be moved slidably along the channel member 42 and placed in a desired position along its associated slat 18. When the actuating member 32 is rotated into its locked position, shown in FIG. 2, wherein an outer surface 66 thereof is positioned generally flush with the housing 24, the hook portion 58 is drawn up into engagement with the edge portion 46 of the channel member 42. When in the locked position, the locking member 56 flattens out as it is placed under tension. In the event the cross bar 19 experiences an excessive upward force, the fixed hook portions 20b help to keep the bracket member 20 secured to the slat 18. The slightly curved shape of the locking member allows a small degree of flexing when an upward force is applied to the cross bar 19 before the fixed hook portion 20b comes into contact with the edge portion 46 of the channel member 42. This causes the bracket member 20 to be secured fixedly to the slat 18 and to strongly resist longitudinal sliding movement along the slat 18.

In the preferred embodiment in which the notches 46a in the channel member 42 are included, the notches are formed having a width which is preferably just slightly larger than the width of the hook portion 58. In this manner the hook portion 58 can engage within one of the notches 46a when the locking member 56 is urged into its locked position to even more securely hold the bracket member 20 stationary on the slat 18.

With further reference to FIG. 3, preferably one or more foam or other like elongated pads 68 and 70 are used with the slat 18. The foam pad 68 serves to seal the channel 34 from the elements, as does the pad 70. The pads 68 and 70 need not be manufactured from foam but could be made from a wide variety of materials which are somewhat resilient. The pads could optionally be formed from a material which helps to provide a water-tight seal.

The slats 18 are preferably injection molded from a suitably high strength plastic such as PVC. The slats 18 are strong yet light in weight. When attached to the outer body surface 14, each of the slats 18 form an extremely low profile member which reduces the degree to which each of the bracket members 20 projects above the outer body surface 14. When the bracket members 20 are attached to their respective slats 18, cooperatively they form a generally gradually curving, aerodynamic profile which is also aesthetically appealing. The low profile of the slats 18 further contributes to increasing the aerodynamic efficiency of the overall vehicle article carrier 10.

It will also be appreciated that the slats 18 of the vehicle article carrier 10 could be used with virtually any form of bracket member which incorporates a hook-like locking or latching member which is manually movable between locked and unlocked positions. Various forms of bracket members which could be adapted for use with the slats 18 of the present invention with little or no modification are disclosed in the following patents assigned to the assignee of the present application, the disclosure of each of which is hereby incorporated by reference into the present application:

| | |
|---|---|
| 4,684,048 | 5,143,267 |
| 4,972,983 | 5,174,484 |
| 4,982,886 | 5,190,198 |
| 5,082,158 | 5,203,483 |
| 5,104,019 | 5,232,138 |
| 5,133,490 | |

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles above an outer body surface of a vehicle, said vehicle article carrier comprising:

a pair of slats adapted to be fixedly secured to said outer body vehicle surface, each said slat including a base portion, an integrally formed, generally U-shaped channel portion, and a tie-down loop integrally formed with said base portion and projecting away from said outer body surface wherein the channel portion is laterally offset from said base portion;

each said slat further including a channel member adapted to be secured to an associated one of said slats and having an edge portion extending toward, and at least partially into, said channel portion of said slat, and further having a bracket supporting portion, said channel member and said one associated slat further being securable to said outer body surface by external fastening members such that said bracket supporting portion is secured against said base portion and both of said channel member and said slat are held to said outer body surface by said external fastening elements;

a cross bar having a pair of terminal end portions;

a pair of bracket members secured to the terminal end portions of said cross bar for supporting said cross bar elevationally above said outer body surface, each of said bracket members being movable slidably along one of said bracket support portions of an associated one of said channel members;

each said bracket member further including a locking member and an actuating member, said actuating member being movable between locked and unlocked positions and operable to move said locking member into a locked position relative to said channel member when said actuating member is moved into said locked position; and each said bracket member further being slidable along said slats once said actuating member is in said unlocked position.

2. The vehicle article carrier of claim 1, wherein each said slat further includes at least one integrally formed tie-down loop projecting away from said outer body surface for helping to secure articles to said cross bar via an external fastening element.

3. The vehicle article carrier of claim 1, wherein said edge portion further comprises a plurality of notches spaced apart along said edge portion of said channel member, each of said notches having a width permitting a portion of said locking member to engage therewith when said locking member is in said locked position.

4. The vehicle article carrier of claim 1, wherein said bracket member is associated with said slat to form a generally curving, aerodynamic shape when said bracket member is secured to its associated said slat.

5. The vehicle article carrier of claim 1, wherein said generally U-shaped channel portion of said slat is adapted to reside within a longitudinally extending channel formed in said outer body surface of said vehicle when said base portion of said slat is secured to said outer body surface of said vehicle.

6. A vehicle article carrier for supporting articles elevationally above an outer body surface of a vehicle, said vehicle article carrier comprising:

a pair of slats adapted to be secured to said outer body surface generally parallel to one another, each said slat including a base portion adapted to be fixedly secured to said outer body surface, a generally U-shaped channel portion integrally formed with and laterally offset from said base portion, and at least one tie-down loop integrally formed with said base portion and extending away from said outer body surface and away from said channel portion, said channel portion being formed so as to present a generally upwardly opening channel when said slat is secured to said outer body surface;

a cross bar having opposite end portions for supporting articles thereon elevationally above said outer body surface of said vehicle;

a pair of channel members each having a bracket supporting portion and an edge portion, and each being adapted to rest on said base portion of an associated one of said slats, each said edge portion being formed so as to project into said U-shaped channel portion;

one of said channel members and said associated bracket member being adapted to be secured together and to said outer body surface such that said base portion of said slat is sandwiched between said bracket supporting portion of said channel member and said outer body surface;

a pair of bracket members secured at said opposite ends to said cross bar and each being operable to rest on said bracket supporting portion of an associated one of said channel members, and to be moved slidably along said bracket supporting portions of said channel members; and each said bracket member including a locking member for engaging with said edge portion of said channel member for securing said bracket member fixedly in a desired position along said slat.

7. The vehicle article carrier of claim 6, wherein said edge portion of each said channel member comprises a plurality of spaced apart notches, each one of said notches having a width sufficient to permit engagement with a portion of an associated one of said locking members when said one locking member is in a locked position relative to said channel member.

8. For a vehicle article carrier, a pair of slats each adapted to be secured to an outer body surface of a vehicle generally parallel to one another and longitudinally along said outer body surface, each of said slats comprising:

a base portion and a generally U-shaped, integrally formed channel portion laterally spaced apart from said base portion, said generally U-shaped channel portion presenting a generally upwardly opening channel when said base portion is secured to said outer body surface of said vehicle; and a channel member having a bracket supporting portion for supporting a locking bracket member of said vehicle article carrier thereon, and an edge portion, said bracket supporting portion being adapted to rest on said base portion of its associated said slat; and said channel member being secured to said slat such that said base portion is sandwiched between said bracket supporting portion and said outer body surface and secured to said outer body surface by external fastening elements.

9. The slat of claim 8, wherein said edge portion of said channel member comprises a plurality of spaced apart notches.

10. The slat of claim 8, wherein said channel member further comprises an integrally formed tie-down loop extending outwardly of said bracket supporting portion of said channel member.

11. The slat of claim 8, wherein said slat is injection molded from polyvinylchloride.

12. The slat of claim 8, wherein said channel member comprises a roll-formed component.

13. A vehicle article carrier for supporting articles above an outer body surface of a vehicle, wherein said vehicle includes a channel formed in said outer body surface, said vehicle article carrier comprising:

a pair of slats adapted to be fixedly secured to said outer body vehicle surface, each said slat including a base portion and a portion adapted to extend into said channel in said outer body surface;

each said slat further including a channel member adapted to be secured to an associated one of said slats, said channel member including a bracket supporting portion for supporting a bracket member thereon and a series of spaced apart securing portions for enabling a locking member associated with said bracket member to be engaged therewith at selected locations along said slat, said channel member further being arranged such that said bracket supporting portion thereof rests above and on said base portion to thereby sandwich said base portion against said outer body surface adjacent said channel in said outer body surface;

at least one securing member for fixedly securing said channel member and said base portion of said slat to said outer body surface;

a cross bar having a pair of terminal end portions;

a pair of bracket members secured to the terminal end portions of said cross bar for supporting said cross bar elevationally above said outer body surface, each of said bracket members being movable slidably along one of said bracket supporting portions of an associated one of said channel members;

each said bracket member further including a locking member and an actuating member, said actuating member being movable between locked and unlocked positions and operable to move said locking member into a locked position relative to said one of said spaced apart securing portions when said actuating member is moved into said locked position; and each said bracket member further being slidable along an associated one of said channel members once its associated said actuating member is moved into said unlocked position.

14. A vehicle article carrier for supporting articles above an outer body surface of a vehicle, wherein said vehicle includes a channel formed in said outer body surface, said vehicle article carrier comprising:

a pair of slats adapted to be fixedly secured to said outer body vehicle surface, each said slat including a base portion and a portion adapted to extend into said channel in said outer body surface;

each said slat further including a channel member adapted to be secured to an associated one of said slats, said channel member including a bracket supporting portion for supporting a bracket member thereon and a series of spaced apart securing portions for enabling a locking member associated with said bracket member to be engaged therewith at selected locations along said slat, said channel member further being arranged such that it rests above and on said base portion to thereby sandwich said base portion against said outer body surface adjacent said channel in said outer body surface;

at least one securing member for fixedly securing said channel member and said base portion of said slat to said outer body surface;

a cross bar having a pair of terminal end portions;

a pair of bracket members secured to the terminal end portions of said cross bar for supporting said cross bar elevationally above said outer body surface, each of said bracket members being movable slidably along one of said bracket supporting portions of an associated one of said channel members;

each said bracket member further including a locking member and an actuating member, said actuating member being movable pivotably by grasping a portion thereof and urging said portion outwardly of its associated bracket member to place said bracket member in an unlocked position relative to its associated said slat, wherein said bracket member can be moved slidably along said slat, and moveable from said unlocked position toward said bracket member to place said bracket member in a locked position relative to said channel member when said locking member engages one of said spaced apart securing portions, thereby securing said bracket member against longitudinal movement on its associated said channel member.

15. The vehicle article carrier of claim 14, wherein a portion of said slat projects upwardly away from said channel in said outer body surface to provide the appearance of a member formed integrally with said outer body surface.

16. The vehicle article carrier of claim 14, wherein said locking member comprises a hook-like member for engaging at least one of said spaced apart securing portions.

17. The vehicle article carrier of claim 14, wherein said spaced apart securing portions overlie said channel in said outer body surface of said vehicle.

18. The vehicle article carrier of claim 17, wherein said base portion of said slat is adapted to cradle said channel member so as to enable precise alignment of said channel member relative to said slat prior to securing said channel member and said slat to said outer body surface of said vehicle.

* * * * *